March 6, 1951 C. W. BALDOCK 2,544,441
SEXTANT ATTACHMENT
Filed April 5, 1948 2 Sheets-Sheet 2
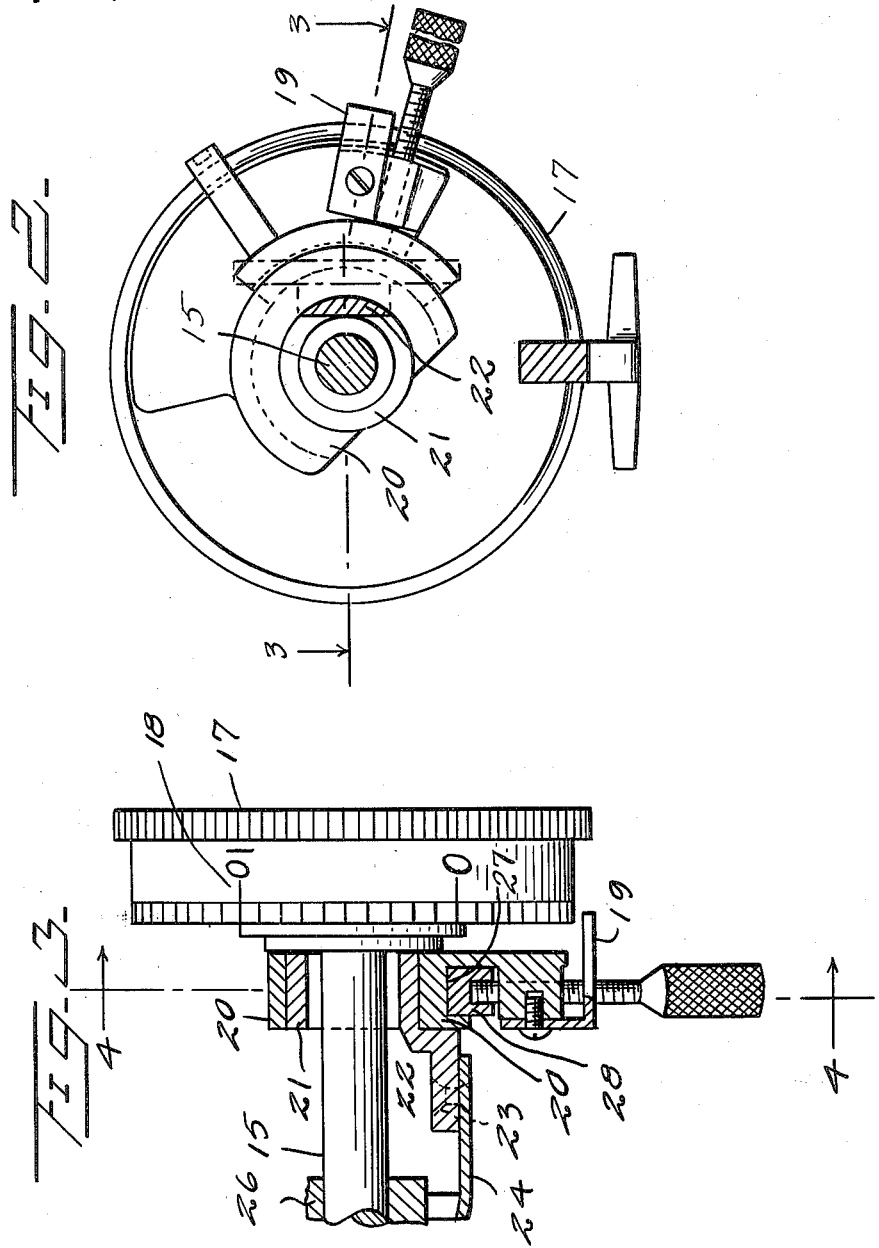
Inventor
C. W. Baldock
By
Kimmel & Crowell Attys.

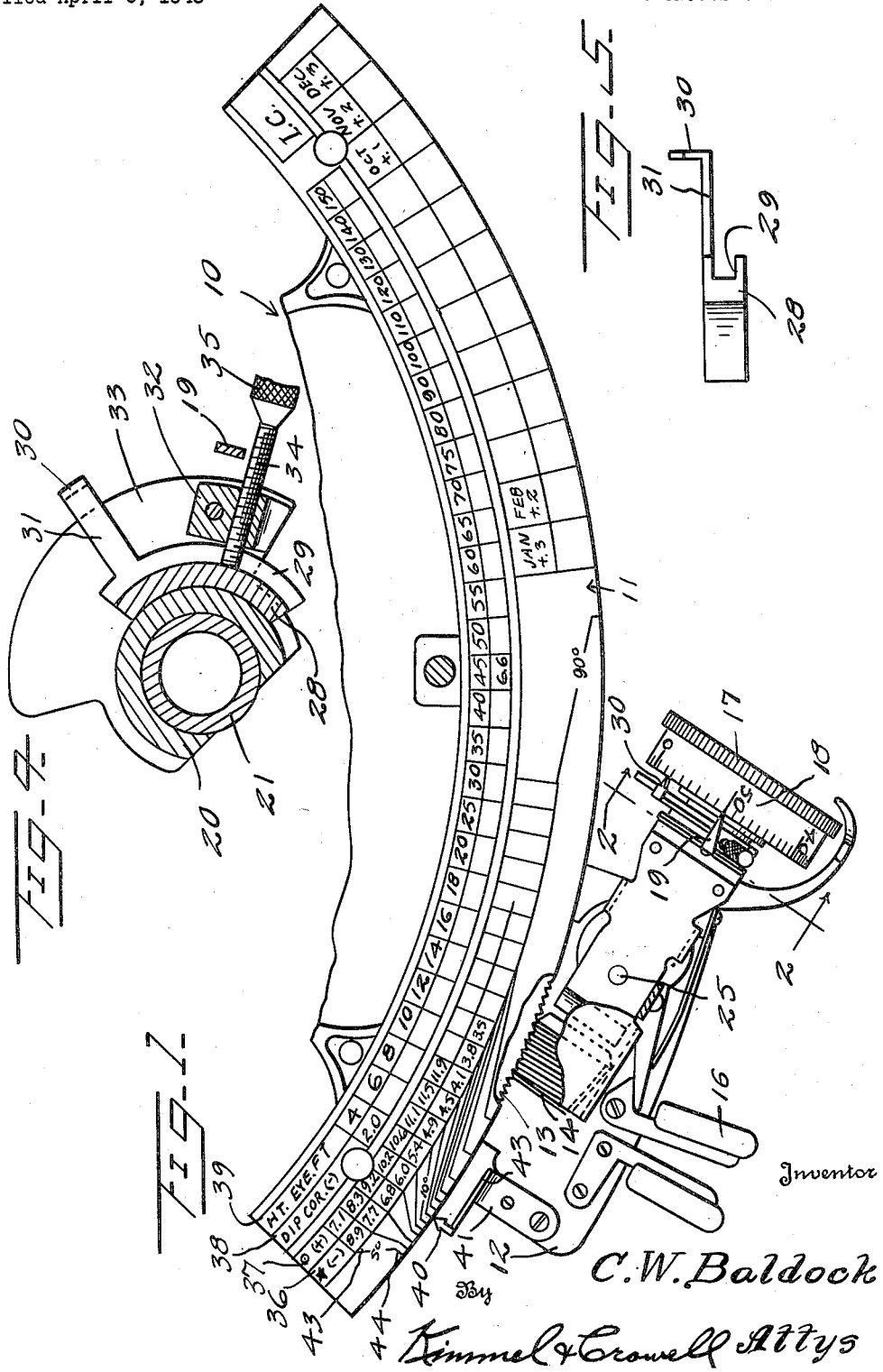

Patented Mar. 6, 1951

2,544,441

UNITED STATES PATENT OFFICE 2,544,441

SEXTANT ATTACHMENT

Charles Wesley Baldock, Key West, Fla.

Application April 5, 1948, Serial No. 19,021

1 Claim. (Cl. 116—129)

This invention relates to sextants.

There are certain errors appearing in sextant altitudes of celestial bodies which can be calculated and proper corrections applied to give true altitudes. These are:

| For Sun or Moon | For Star or Planet |
| --- | --- |
| Index error<br>DIP (height of eye correction)<br>Refraction<br>Parallax<br>Semi-diameter | Index error<br>DIP (height of eye correction)<br>Refraction |

The corrections relating to the above appear in the Air and Nautical Almanacs and all lines of position books.

The present invention relates to corrections for Index Error, called Index Correction, or IC of a sextant which is the error of its indications due to the fact that when the index and horizon mirrors are parallel, the zero of the micrometer adjustment does not coincide with the zero of the altitude scale. IC may be caused by a number of conditions, such as rough usage of the sextant by jarring the same when putting it in its box, laying the sextant down too hard on the chart desk, or bumping mirrors against some object. Taking the index error out of a sextant is not difficult when a person knows how to do it, but it is difficult and hard to explain and also hard to follow instructions, and in addition considerable practice is required. Where the index error is left in a sextant, extra figuring is required each time a sight is taken, and the chances of error are increased in addition to requiring extra time to get the position.

It is, therefore, an object of this invention to provide an attachment for a sextant which will eliminate the chances of error in calculations, and shorten the time for getting the position.

Another object of this invention is to provide an attachment of this kind which can also be combined with the DIP (height of eye correction) so that the index arm can be adjusted in one movement thereof by means of the micrometer adjustment wheel to provide for both IC and DIP corrections.

A further object of this invention is to provide an attachment which will permit reading the true altitude directly from the sextant and will eliminate the study of reference books and tables and the paper work usually required under prior methods and apparatus.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary side elevation, partly in section, of a sextant having an attachment constructed according to an embodiment of this invention, mounted thereon.

Figure 2 is an enlarged sectional view taken on the line 2—2 of Figure 1.

Figure 3 is a detailed side elevation, partly in longitudinal section, of the attachment in applied position.

Figure 4 is a sectional view taken on the line 4—4 of Figure 3.

Figure 5 is a detailed end elevation of the adjustable pointer.

Referring to the drawings, the numeral 10 designates generally a sextant which includes an arcuate or segmental index arc or bar 11 over which an index arm 12 is adapted to be moved. The index bar 11 is formed with fragmentary threads 13 extending longitudinally thereof which are engaged by a worm 14 carried by a worm or micrometer adjustment shaft 15. The index arm 12 is adapted to be roughly adjusted by means of a spring-pressed release member 16 which is carried by the arm 12 and engages the micrometer or fine adjustment structure including the worm 14 and the shaft 15 for disengaging the worm from the fragmentary threads 13. The worm shaft 15 has mounted thereon an index wheel 17 carrying graduations 18. The structure hereinbefore described is conventional structure in a sextant.

It is well known that in sextants there is an error commonly known as an index error which may be caused by rough usage of the sextant or by other factors. This error can be readily calculated and while it may be a relatively small error, nevertheless, this error entering into the calculations associated with the use of the sextant produces an error in the final calculations as to position. In order to provide a means whereby the index error or correction may be incorporated in all of the calculations associated with the sextant, I have provided an attachment which includes a pointer 19 which is carried by a split ring 20.

The ring 20 frictionally engages a bearing ring 21 which is supported from a lug 22 secured by fastening means 23 to a supporting arm 24. The supporting arm 24 is secured by fastening means 25 to the bearing lug 26 for the micrometer adjustment shaft 15. The split ring 20 is formed with a peripheral groove 27 within which an adjustable segment 28 having a groove 29 loosely engages. The adjustable segment 29 has secured thereto a pointer 30 which is connected with the segment 28 by means of a connecting arm or bar 31. The pointer 19 is secured to a lug 32 which is carried by a sector-shaped plate 33 fixed relative to or formed integral with the split ring 20. The adjustable pointer 30 is secured in adjusted position relative to the pointer 19 by means of a set screw 34 which is threaded through the lug 32 and is adapted to engage in the groove 29. An enlarged knob 35 is carried by the outer end of the set screw 34 and provides a means whereby the set screw 34 may be tightened or loosened and also provides a means whereby the two pointers 19 and 30 may be circumferentially adjusted as a unit relative to the micrometer adjustment index wheel 17 and the graduations 18 on the wheel 17.

The arcuate index bar 11 on the side of this bar opposite from normal graduations carried by this bar over which the index arm 12 engages is provided with graduations which include an arcuate series of calculations 36 indicating the corrections necessary in the calculations when a star or planet is sighted by the instrument, the calculations 36 being minus calculations. A second series of calculations 37 are also provided on the bar 11 which are plus calculations and are to be used when sighting the sun. A third series of calculations 38 is provided on the bar 11 indicating the minus corrections necessary for height of the eye and a fourth series of calculations 39 is provided on the bar 11 indicating the height in feet of the eye. The calculations 39 are correlated with the calculations 38 so that when the height of the eye is determined the necessary minus calculation may be made to provide for correction in the calculations for height of the eye.

A pointer 40 is fixed to the index arm 12 being carried by a base 41 having a right angular arm 42. The pointer 40 is adapted to move over the graduations 36 which include lead lines 43 and outer graduations 44.

In the use and operation of this device the pointer 30 is initially adjusted relative to the pointer 19 to show the corrections normally appearing in the calculations for height of eye and also for index error which appears in the instrument. In the present instance, it is assumed that the error in the instrument is 1.5 and assuming that the height of the eye is 4.9, pointer 30 is adjusted from pointer 19 a distance of 6.4. Where a planet or star is being sighted, this factor will be a minus factor. The instrument is sighted and initially adjusted in the normal manner, the micrometer wheel being adjusted to provide for registering or matching of the two images which are viewed through the sight. After the index arm 12 has been properly adjusted in the normal and conventional manner, adjusting knob 35 is moved so as to position pointer 30 at the nearest 5' indication 18 on wheel 17. Inasmuch as the numeral 6.4 is a minus numeral or correction, micrometer wheel 17 is reversed so as to reduce the calculation appearing on the opposite side of index bar 11 which is indicated by index arm 12. The wheel 17 is reversed in its rotation from the point where pointer 30 was set with respect to the graduations 18 so that the 5' graduation will be moved to register with pointer 19. The instrument is then viewed on the opposite side of bar 11 and the graduation indicated by index arm 12 and micrometer wheel 17 will give the correct position without the necessity of setting down the initial calculation indicated by the index arm 12 and then subtracting the index correction factor and the height of eye factor from the sighted indication.

As an example of the use of this device, where the sun is sighted the following calculations were determined from a vessel which was in dead reckoning position at latitude 24–10.2N, 81–30.6W. The line of position with a conventional sextant indicated the following calculations on the sextant:

Hs _____ 66–33.4

The following calculations were also determined:

I. C _____ +2.0
Alt. C _____ +15.6
Monthly sun corr _____ –.2
Ht. eye or DIP _____ –4.9
                                    ─────
                                    +12.5

Inasmuch as the sighting of the sun gives a plus factor to the instrument 12.5 is added to the initial calculation of 66–33.4 giving a HO 66–45.9. The above calculations are made on paper and from graduation tables convention in Air and Nautical Almanacs and all line of position books.

With the use of the attachment hereinbefore described, the plus factor 12.5 is initially determined and set up with respect to the pointers 19 and 30. The instrument is then viewed in the normal manner and when the objective has been sighted, pointer 30 is adjusted to the closest 5' graduation 18, whereupon wheel 17 is rotated in a direction to increase the calculations indicated by index arm 12 on the opposite side of bar 11 which is shown in Figure 1. The instrument with the attachment will quickly and accurately without the use of paper work at the time of using the instrument give the correct sighting position in a very substantially less time than the calculations which are obtained by an instrument which does not have this attachment thereon. This attachment may be mounted on any conventional sextant without interfering with the normal functioning of the sextant.

I claim:

An attachment for the micrometer adjustment worm shaft and index wheel of a sextant having a bearing for the shaft carried by the index arm comprising a supporting arm fixed to said bearing, a bearing ring carried by said supporting arm and loosely engaging about said shaft adjacent to said wheel, a split ring frictionally engaging about said bearing ring and formed with a peripheral groove, a first pointer carried by said split ring, a segmental member engaging in said groove and slidable therealong, a second pointer carried by said segmental member, and locking means carried by said split ring and engageable with said segmental member for selectively preventing motion of said split ring and said segmental member relative to each other whereby said first and second pointers may be adjusted relative to each other and as a unit relative to said wheel.

CHARLES WESLEY BALDOCK.

(References on following page)

REFERENCES CITED

The following references are of record in the file of this patent:

UNITED STATES PATENTS

| Number | Name | Date |
|---|---|---|
| 100,821 | Tuttle | Mar. 15, 1870 |
| 765,426 | Herrick | Sept. 12, 1903 |
| 772,588 | Tindall | Oct. 14, 1904 |
| 918,709 | Smith | Apr. 20, 1909 |
| 1,949,908 | Hawk | Mar. 6, 1934 |
| 2,186,553 | Linde et al. | Jan. 9, 1940 |
| 2,231,609 | Anderson | Feb. 11, 1941 |
| 2,273,956 | Hall | Feb. 24, 1942 |
| 2,413,214 | Carlson | Dec. 24, 1946 |
| 2,420,639 | Leonard | May 13, 1947 |
| 2,439,102 | Rothweller | Apr. 6, 1948 |
| 2,445,943 | Edelen | July 27, 1948 |
| 2,463,649 | Shiffield | Mar. 8, 1949 |